(No Model.)
J. BENNETT.
BONDING AND TYING.
No. 605,468. Patented June 14, 1898.
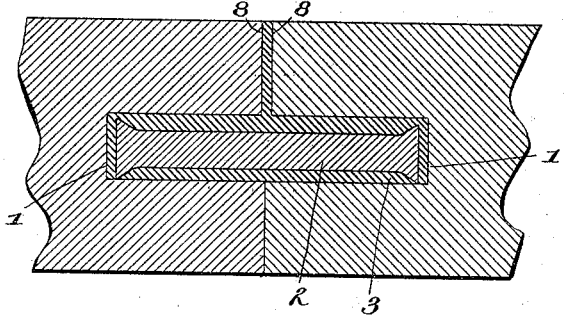
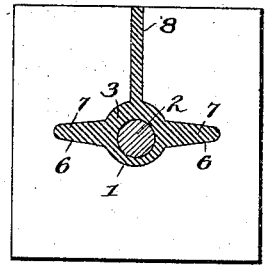
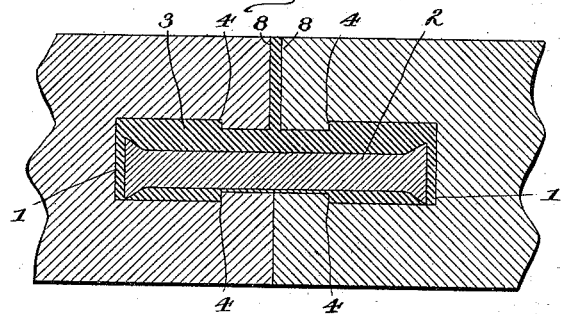
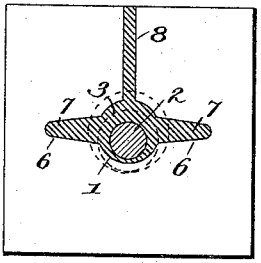
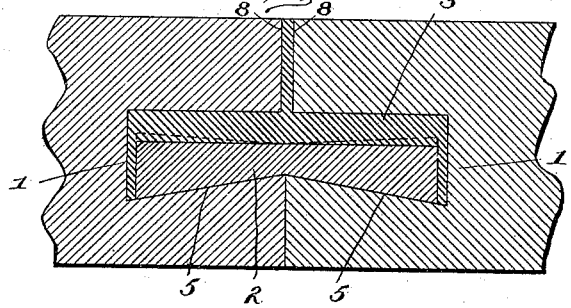
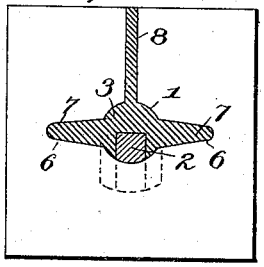
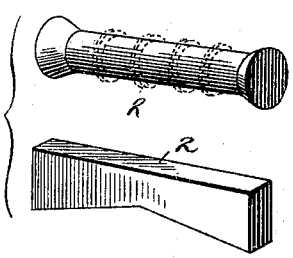
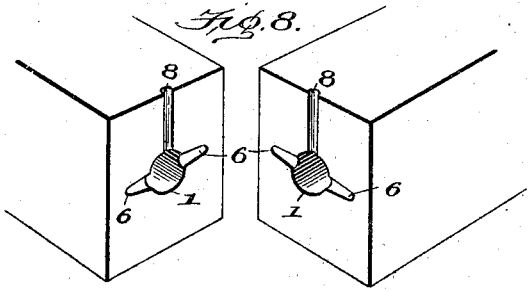
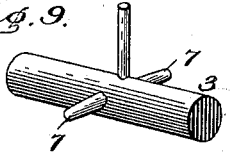
WITNESSES:
Edwin L. Bradford
Geo. M. Copenhaver
INVENTOR
John Bennett
BY Johnson and Johnson
ATTORNEYS.

United States Patent Office.

JOHN BENNETT, OF PARIS, MAINE.

BONDING AND TYING.

SPECIFICATION forming part of Letters Patent No. 605,468, dated June 14, 1898.

Application filed December 20, 1897. Serial No. 662,660. (No model.)

*To all whom it may concern:*

Be it known that I, JOHN BENNETT, a citizen of the United States, residing at South Paris, in the county of Oxford and State of Maine, have invented certain new and useful Improvements in Bonding and Tying, of which the following is a specification.

My invention relates to improvements in bonding and tying bodies together. It is especially adapted for bonding and bracing curbing to form a bar at the joint against the action and results of frost, which tend to force the sections out of alinement, to prevent the end of one section being raised above the other, or the twisting of one section upon the other, or the opening of one section in relation to the other. My invention is, however, adapted for the bonding of various things and bodies without regard to the material of the bodies, and especially is it advantageous in the joining of columns and statues constructed in sections or which may be broken. In these uses the bonding and tying which constitutes my invention is especially adapted by reason of being invisible for bonding facing-stones or anything where it is desirable that the bonding should not be exposed and where great strength to hold the bodies together is required.

My improvement consists of certain parts and combinations of parts wherein a bond or tie-bar formed by a solid body is combined with an enveloping fastening-bond formed by a body or substance in the condition of a liquid, both bonds crossing the joint of the bonded parts and embedded within and fastened alike to each part. In this combination the bond formed from a substance in a liquid condition engages as a solid bar the walls of excavations made in the abutting parts and also engages and envelops the solid tie-bar as an unbroken body extending from the bottom or end of one excavation to the bottom or end of the other excavation, firmly binding and bracing the joined parts together.

The invention is illustrated in the accompanying drawings, and the following description and claims will distinguish it from what is old in the art.

In the drawings I have shown my invention as applied to the bonding of curbing for pavements, and Figure 1 shows in vertical section parts of abutting curbstones joined and bonded in accordance with my invention. Fig. 2 is a vertical transverse section taken at the joint. Figs. 3 and 4 are like views of a slightly-modified construction. Figs. 5 and 6 are like views of another modified construction. Fig. 7 shows two forms of tie-bars, Fig. 8 shows the abutting ends of curbstones excavated to receive the bonding, and Fig. 9 shows the cast bond with its circumferential arms.

In the joint-forming ends of the parts to be bonded are identical excavations 1 1, of equal depth and symmetrically located, so that the proper joining of the parts will bring the excavations in coincident relation for the reception of my new bonding, which crosses the joint and extends equally into the excavations. This bonding consists of two parts, a solid bar 2 for strength and an inclosing part 3, formed or cast of a substance having a liquid condition poured or injected in the excavations around the solid bar, so that in solidifying it combines with and forms the fastening for the solid bar and extends unbroken from one excavation into the other and constitutes a sort of pipe which may or may not be closed at its ends over the solid bar. In filling the excavations the liquid substance in solidifying becomes fastened to the walls of the excavations and to the solid bar.

The solid tie-bar may be made with or without enlarged ends, and it will be understood that of whatever form and size it forms the core or center for the bond, which is cast over it within and through the joined excavations.

The solid tie-bar may be made of any suitable form in cross-section, and the excavations may be made of any form in cross-section and in their combined length equal or slightly greater than the length of the solid bar.

In Figs. 1 and 3 the solid tie-bar is shown of cylindrical form with enlarged ends, and these ends may be of any form and may or may not fill the excavations. In Fig. 3 the inner ends of the excavations are shown of greater area than the outer ends to form shoulders 4 4 to give greater resistance against the separation of the bonded parts.

In Figs. 5 and 6 the solid bar is of flat cross-section and engages the excavations of each abutting part by a downwardly-standing incline 5 5, having the form of a sort of double wedge acting to draw the joined parts together, and in this function the cast bond coöperates with the inclines as it fills the space above and around the flat solid wedge-bond, fastening it upon the walls of the excavations, which incline or flare from the joint in opposite directions.

To prevent the twisting or turning of one of the joined parts upon the other, I provide grooves 6 6 in their abutting ends, which open into the excavations, the groove in one end matching the groove in the other end, so that in the process of forming the cast bond in filling the excavation the liquid substance will fill the grooves and form projections or arms 7 7 upon the circumference of the cast bond. The abutting ends of the bodies to be bonded are formed with coincident grooves or channels 8 8, which when the bodies are joined form the duct through which the liquid substance is introduced into the excavations to form the cast bond over the solid bond.

By having the excavations larger than the solid tie-bar it gives the advantage of casting a fastening-bond over a strengthening-bond and of fitting the bodies to be bonded to an exact joint, and especially in broken work. The substance for the cast fastening-bond I prefer to use is what is known as "commercial brimstone," because I have found it effective; but any suitable material that has the requisite strength and is soluble or any suitable metal will be within my invention.

It is important to notice that in preventing the turning of the parts one upon the other the resistance is born by the cast bond at its crossing of the joint.

My invention is well suited for bonding bodies of wood or of metal, and the solid tie-bar may have transverse ribs or ridges at intervals in its length, broken or unbroken to increase the bonding effect.

While I have thus described the preferred embodiment of my invention in the process of forming the cast bond upon a solid bond, it will be evident to those skilled in the art that the details of construction may be varied without departing from the spirit of my invention or sacrificing any of its advantages.

I claim as my invention—

1. A bond for joining and bracing bodies, consisting of a two-part bonding-bar, one cast over and inclosing the other bar and both bars engaging invisible excavations in the joining ends of the bodies.

2. A bond for joining and bracing bodies having excavations in their joining-surfaces, consisting of a double-ended solid tie-bar entering said excavations, and a fastening part cast over and enveloping the entire body of said solid bar within said excavations and crossing the joining-surfaces, the enveloping bond forming a tubular engaging-body within the joined parts.

3. For joining and bracing bodies having excavations in their joining-surfaces, a solid bar entering alike said excavations and a bond cast of tubular form crossing the joining-surfaces as a fastening for the solid bar to the surrounding walls of the excavations in the way stated.

4. For joining and bracing bodies having excavations in their joining-surfaces and grooves or channels opening into said excavations and a filling-duct opening at the surface of the joined parts, a solid bar entering alike said excavations, and a bond cast of tubular form crossing the joining-surfaces for fastening the solid bar to the walls of the excavations and forming circumferential projections or arms upon said cast bond at the joining of the bonded bodies.

5. For joining and bracing bodies having excavations in their joining-surfaces, a tubular fastening-bond cast over a strengthening-bond within and crossing the joining-surfaces.

6. A bond for joining and bracing bodies consisting of a solid bar and a bar formed around it having circumferential arms, both bars and arms engaging the joined parts.

JOHN BENNETT.

Witnesses:
HENRY W. DEAN,
EDWARD J. LAMBE.